(12) United States Patent
Bufe et al.

(10) Patent No.: US 11,544,485 B2
(45) Date of Patent: Jan. 3, 2023

(54) DEVICE AND METHOD FOR CODING HIGH FREQUENCY (HF) TRANSPONDERS

(71) Applicant: Muehlbauer GmbH & Co. KG, Roding (DE)

(72) Inventors: Henrik Bufe, Dresden (DE); Georg Voigtlaender, Dresden (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 242 days.

(21) Appl. No.: 16/962,034

(22) PCT Filed: Jan. 23, 2019

(86) PCT No.: PCT/EP2019/051554
§ 371 (c)(1),
(2) Date: Jul. 14, 2020

(87) PCT Pub. No.: WO2019/145319
PCT Pub. Date: Aug. 1, 2019

(65) Prior Publication Data
US 2020/0401773 A1    Dec. 24, 2020

(30) Foreign Application Priority Data
Jan. 26, 2018    (DE) .......................... 102018000628.0

(51) Int. Cl.
*G06K 7/10*    (2006.01)
(52) U.S. Cl.
CPC ............................... *G06K 7/10475* (2013.01)

(58) Field of Classification Search
None
See application file for complete search history.

(56) References Cited

U.S. PATENT DOCUMENTS

| | | | |
|---|---|---|---|
| 8,111,142 B2 * | 2/2012 | Mizukawa | G06K 7/10475 340/10.5 |
| 8,896,425 B1 | 11/2014 | Martin | |
| 9,697,387 B1 * | 7/2017 | Bowman | G06K 7/10009 |
| 10,217,035 B2 * | 2/2019 | Miura | G06K 13/073 |

(Continued)

FOREIGN PATENT DOCUMENTS

DE    202013004511 U1    8/2014
EP    1538552 A2    6/2005

*Primary Examiner* — Thien M Le
*Assistant Examiner* — April A Taylor
(74) *Attorney, Agent, or Firm* — John A. Miller; Shumaker, Loop & Kendrick, LLP

(57) ABSTRACT

A device for coding HF transponders moving along a conveyor device. The device includes a first machining station, arranged and designed to identify a respective HF transponder being guided past the first machining station, and a second machining station with an HF antenna. The HF antenna has a transmission region that is arranged and designed to simultaneously detect a plurality of the HF transponders being guided past the second machining station by the conveyor device. The second machining station is additionally designed to select a respective HF transponder detected in the transmission region of the HF antenna for transmission of data and to transmit data to the selected HF transponder, where the transmitted data is ascertained on the basis of the identification of the selected HF transponder by the first machining station.

9 Claims, 2 Drawing Sheets

(56) References Cited

U.S. PATENT DOCUMENTS

| | | |
|---|---|---|
| 2007/0120670 A1 | 5/2007 | Torchalski |
| 2008/0231419 A1 | 9/2008 | Mizukawa et al. |
| 2010/0156615 A1* | 6/2010 | Ochiai ............... G06K 17/0025 |
| | | 340/10.51 |
| 2016/0189019 A1 | 6/2016 | Duckett et al. |

* cited by examiner

DEVICE AND METHOD FOR CODING HIGH FREQUENCY (HF) TRANSPONDERS

CROSS-REFERENCE TO RELATED APPLICATIONS

This application is a National Stage application of International Application No. PCT/EP2019/051554 filed Jan. 23, 2019, which claims priority to German Patent Application Serial No. DE 10 2018 000 628.6, filed Jan. 26, 2018.

BACKGROUND

There are described herein a device and a method for coding HF transponders. There are described in particular a device and a method for coding RFID transponders in the HF wavelength range. Features and properties of the device and of the method are defined in the claims; however, the description and the figures also disclose characteristics of the device and of the method and of the various aspects thereof.

Such HF transponders are used, for example, for labels, such as, for example, price tags, documents of value or security documents or the like, and generally have a single- or multi-layer body.

In order to take account of increasing security requirements, transponders (transponder inlays), for example, are increasingly being used also in documents of value and security documents (debit cards, credit cards, passports, identity cards, access control cards, etc.). RFID transponders for documents of value and security documents are nowadays frequently manufactured in a standardized form, apart from personalization data, and subsequently coded with individual data sets and/or transponder-individual information.

A HF transponder, in particular for RFID (=radio frequency identification) applications, has essentially a semiconductor chip and an antenna in the form of a coil, loop or dipole. The antenna permits contactless data access, that is to say contactless, automated writing, or coding, and/or reading of (personalization) data to/from the semiconductor chip of the transponder.

A system for continuous RFID coding is known from US 2007/0120670 A1. The system comprises a sensor antenna and a coding antenna. RFID tags with their transponders are guided in succession past these two antennas, wherein the sensor antenna serves to identify the transponders and the coding antenna serves to code the transponders.

A device with which data can be stored in RFID tags is known from US 2008/0231419 A1. For that purpose, the tags are guided past multiple stations, each of which has an antenna. A first station serves to identify the tags, and at a second station the data are written to the tags.

In order to code HF transponders with transponder-individual information, it has hitherto been necessary to selectively address and write to, or code, each HF transponder by means of a corresponding coding device. For that purpose, the transponder to be written to is guided into the detection range of a HF antenna, remains there during addressing and writing, and is finally removed from the detection range of the HF antenna again, so that a further HF transponder can be supplied or coded. In other words, the HF transponders are supplied to the coding device, coded and removed one after the other in a "stop & go" method. However, this method has the disadvantage that, even when the addressing, writing and transport operations are completely or at least almost optimized, a loss of time always occurs due to the necessary acceleration or the necessary slowing down of the HF transponders (or of a transport device which holds the transponders ready) in the region of the coding device. Since the acceleration or slowing down of the HF transponder (or of the transport device) is a mechanical operation, it cannot moreover be accelerated or retarded at least arbitrarily. Coding of HF transponders can take place, for example, within a time period of from 50 to 300 milliseconds, so that a time period in which a coded HF transponder is mechanically removed from the detection range of a coding device and/or a further transponder to be coded is supplied to the device always leads to a relevant delay of the coding operation. Owing to the supply or removal of the HF transponders, time windows in which the coding device is not actively coding a transponder regularly occur. The throughput speed, or the maximum production rate, of a coding device is limited thereby.

Despite known coding devices, there is accordingly a need for an improved device which in particular permits the continuous coding of a plurality of HF transponders without the occurrence at a processing station of waiting times for the supply or removal of individual HF transponders to be coded.

SUMMARY

The problem is solved by a device as claimed in claim 1 and by a method as claimed in claim 8. Advantageous embodiments of the method and of the device are defined by the further claims.

A device for coding HF transponders comprises a conveyor device which is arranged and configured to guide HF transponders past a plurality of processing stations in a continuous movement. In particular, an almost endless succession of HF transponders to be coded can be guided in a continuous movement and with an at least substantially constant speed past/through a plurality of processing stations. The HF transponders can in particular be guided by the conveyor device in such a manner that neither a position/distance of the HF transponders relative to one another nor a position of the transponders in/on the conveyor device changes. The conveyor device can be, for example, a conveyor belt guided via rollers, which is suitable for guiding a plurality of HF transponders one after the other past the plurality of processing stations in a continuous movement.

The HF transponders can thereby be arranged on/by the conveyor device in such a manner that the distance between two conveyed HF transponders in the conveying direction is in each case smaller than a longitudinal extent of the conveyed transponders. The longitudinal extent hereby denotes a length, or a spatial extent, of the HF transponders in the conveying direction of the conveyor device. In other words, the longitudinal extent is the spatial extent of the HF transponders in a spatial dimension along the conveying path.

The device further comprises a first processing station which is arranged and configured to identify/classify HF transponders guided past it. Identify here means the detection of a specific feature of an individual HF transponder, for example a transponder identifier that is read or an optically recognizable marking, which allows the HF transponder to be associated with stored information, for example a data set to be transmitted. HF transponders can also be identified/classified as belonging to a group or as belonging to a specific type of HF transponders. For example, an individual HF transponder can be classified as belonging to a predetermined group, wherein a predetermined data set is to be transmitted to each of the HF transponders of the predetermined group.

For example, the first processing station can comprise a reader antenna which is suitable for identifying a HF transponder guided past the first processing station, in particular by reading transponder-specific information (ID).

The device further comprises a second processing station having at least a first HF antenna, which is arranged along the conveying path of the conveyor device. The first HF antenna has a transmission range which is arranged and configured to simultaneously detect a plurality of HF transponders guided past the second processing station by the conveyor device. The second processing station is further configured to select one of the HF transponders detected by the transmission range of the first HF antenna for the transmission of data and to transmit data to the selected HF transponder, wherein the transmitted data are determined in dependence on a previous identification of the selected HF transponder by the first processing station.

The first HF antenna thereby has a longitudinal extent which corresponds at least to the cumulative longitudinal extent of a plurality of HF transponders. The longitudinal extent hereby denotes a length, or a spatial extent, of the HF antenna, or of the HF transponders, in the conveying direction of the conveyor device. In other words, the longitudinal extent is the distance over which a HF antenna extends along the conveying path of the HF transponders, or the spatial extent of the HF transponders in a spatial dimension along the conveying path.

The transmission range of the first HF antenna has at least the same or a larger longitudinal extent as the first HF antenna, so that a plurality of conveyed HF transponders can simultaneously be situated in the transmission range of the HF antenna, wherein the HF transponders are moved continuously in the conveying direction by the conveyor device.

The transmission range of the first HF antenna can, for example, detect a region of the conveyor device such that, at any operating time, at least two or three HF transponders of an almost endless succession of conveyed HF transponders are situated in the transmission range of the first HF antenna.

An advantage here is that the second processing station can continuously code HF transponders without a coding operation being interrupted on account of the removal of an already coded HF transponder or the supply of an HF transponder.

The second processing station can be configured to address with the first HF antenna each of the HF transponders previously identified/classified by the first processing station and then, if the addressing of the particular identified/classified HF transponder was successful, to code the HF transponder, wherein coding data provided for that purpose are to be determined/selected/provided/transmitted in dependence on the identification/classification of the transponder. When the coding of an identified/classified HF transponder is complete, the coding of a further HF transponder can take place immediately. The order in which the HF transponders are addressed or coded can correspond to the order in which the HF transponders are identified/classified by the first processing station. Addressing here means the sending of an address signal to a specific identified/classified HF transponder and the receiving of a HF transponder response to the address signal, wherein the first HF antenna of the second processing station is suitable for both. Addressing can be deemed to have been successful when a response to the sending of an address signal from the particular identified/classified HF transponder to which the sent address signal is directed can be detected.

According to the invention, the second processing station is adapted, in the case of unsuccessful addressing of a first previously identified/classified HF transponder, to immediately continue with the addressing of a further identified/classified HF transponder following the first identified/classified HF transponder and, if the addressing of the further identified/classified HF transponder was successful, to code that HF transponder. The second processing station is further adapted to address the first identified/classified HF transponder again when coding of the further identified/classified HF transponder is complete.

An advantage here is that, in the event of unsuccessful addressing of a HF transponder, it is possible to continue immediately with the coding of a further HF transponder situated in the detection range of the first HF antenna. A loss of production time can thus be reduced. An advantage over the "stop & go" method is that the coding of transponders can be continued without delay and without further, in particular mechanical, control measures of the conveyor device. Furthermore, it is then possible to attempt to address the previously unsuccessfully addressed HF transponder again, so that a HF transponder that is still in the transmission range of the first HF antenna and was initially unsuccessfully addressed can still be coded without interrupting the continuous conveying of the HF transponders.

The second processing station can further be adapted to carry out addressing of a HF transponder a maximum of two or three times.

The addressing and coding of HF transponders by the second processing station can take place continuously, that is to say, for example, without trigger signals that initiate addressing or coding. An advantage here is that the implementation of the second processing station can be simplified.

The second processing station can be configured to commence a production operation, or coding operation, in a time-delayed manner after a first successful identification of a HF transponder by the first production station, wherein the time delay can be measured according to the spatial distance of the first and second processing station and the conveying speed of the conveyor device. An advantage here is that the commencement of a production operation, or coding operation, of the device can be improved in that initially unsuccessful addressing attempts by the second processing station are avoided.

In a further development, the conveyor device can be suitable for guiding past the plurality of processing stations a plurality of HF transponders arranged side by side orthogonally to the conveying direction and/or a plurality of HF transponders arranged one behind the other in the conveying direction.

An advantage here is that successions of HF transponders each arranged in parallel side by side can be conveyed and/or coded simultaneously, and a production capacity or coding capacity of the device can accordingly be multiplied.

Alternatively or in addition to the described reader antenna, the first processing station in a further development can have at least one optically detecting sensor, for example a camera sensor, which is suitable for identifying a HF transponder on the basis of optically recognizable features and/or of detecting a property defect of a HF transponder and/or of detecting a positioning error of a HF transponder on the conveyor device.

Identification on the basis of optically recognizable features can take place, for example, by the optical detection of features which have been printed onto the HF transponders before the start of coding, for example bar codes or QR codes. A recognized positioning error and/or a detected property defect, in particular damage, can be linked by the first processing station with identification or classification information and transmitted to a controller or a further processing station. In particular, the device can also comprise an elimination station which eliminates identified HF transponders with recognized positioning errors and/or property defects.

If the conveyor device is configured to convey a plurality of HF transponders arranged side by side orthogonally to the conveying direction, the first processing station can in an analogous manner be adapted to simultaneously identify/detect multiple HF transponders arranged side by side orthogonally to the conveying direction. For this purpose, the first processing station can have, for example, multiple reader antennas and/or optical sensors arranged side by side orthogonally to the conveying direction.

In a variant, the first processing station can comprise shielding elements which are arranged and configured to electromagnetically shield all the HF transponders, apart from a HF transponder that is being guided past the first processing station, from a detection range of the reader antenna.

The shielding elements can in particular be produced from a material with low permeability to electromagnetic radiation.

The shielding elements can have, for example, an opening, or gap, having the basic shape of a HF transponder to be identified/classified and can be arranged between the HF transponders conveyed by the conveyor device and a reader antenna.

In a further development, the second processing station can further comprise a second HF antenna. The first HF antenna and the second HF antenna can be configured in the same way. The first HF antenna and the second HF antenna can be supplied with electrical energy and/or electrical signals by a common voltage divider.

The first and/or the second HF antenna can have a longitudinal extent of 30 centimeters.

The second HF antenna can in particular be arranged in the conveying direction parallel to the first HF antenna. The first and the second HF antenna can be configured each to deliver a corresponding electromagnetic signal. The first and the second HF antenna can accordingly carry out addressing and/or coding of a HF transponder in cooperation. Alternatively, the two HF antennas can each carry out addressing and/or coding of two HF transponders conveyed in parallel, in particular with the same coding information or the same predetermined data set.

If the conveyor device is configured to convey a plurality of HF transponders arranged side by side orthogonally to the conveying direction, the second processing station can in an analogous manner be adapted to simultaneously address and/or code multiple HF transponders arranged side by side orthogonally to the conveying direction. For this purpose, the second processing station can have, for example, multiple HF antennas or HF antenna pairs arranged side by side orthogonally to the conveying direction.

In a further development, the device can further comprise a third processing station having a third HF antenna and/or a fourth HF antenna, wherein the third HF antenna and/or the fourth HF antenna can each have a transmission range which is arranged and configured to simultaneously detect a plurality of the HF transponders guided past the third processing station by the conveyor device.

The third processing station can be configured to select one of the HF transponders detected by the transmission range of the third and/or fourth HF antenna for the transmission of data and to transmit data to the selected HF transponder, wherein the transmitted data are determined in dependence on an identification of the selected HF transponder by the first processing station.

The third processing station can be configured, for example, in the same way as a previously described variant of the second processing station.

An advantage here is that, for example, a first portion of a predetermined data set can be transmitted by the second processing station and a second portion of a predetermined data set can be transmitted by the third processing station, wherein a high conveying speed of the individual transponders can be maintained. Since in practice the HF antennas cannot be configured with an arbitrarily large longitudinal extent, only a limited amount of data can be transmitted to the HF transponders at a predetermined continuous conveying speed, since the HF transponders would otherwise leave the transmission range of the HF antennas during the transmission operation. In contrast, if the conveying speed were reduced, the first processing station, for example, measured by the technically possible speed for identification/classification of the components, would not be utilized or would be underutilized. Therefore, the arrangement of two (or more) processing stations configured in the same way for coding HF transponders one behind the other offers a synergistic added value.

The device can further comprise a fourth processing station which is arranged and configured to print a surface of HF transponders that are being guided past, for example with a bar code or QR code.

In a variant, the device can additionally have a database which stores data/data sets which are to be transmitted to a specific HF transponder, and/or can comprise a controller which is configured to determine data/data sets stored in the database in dependence on an identification of a HF transponder by the first processing station. The data/data sets determined by the controller can be transmitted to the second and/or third processing station with information which associates the data/data sets with the identified/classified HF transponder. Furthermore, the controller can also associate information that indicates a detected property defect or positioning error of a component with an identified/classified transponder.

A method for using the device as claimed in any one of the preceding claims comprises the steps:

continuously conveying HF transponders in a conveying direction past a plurality of processing stations by a conveyor device;

identifying a HF transponder by a first processing station;

detecting the identified HF transponder by a second processing station, wherein the second processing station has at least a first HF antenna having a transmission range which is arranged and configured to simultaneously detect a plurality of the HF transponders guided past the second processing station by the conveyor device, and the second processing station is configured to select the identified HF transponder from a plurality of detected HF transponders for the transmission of data;

transmitting data to the identified HF transponder by the second processing station, wherein the transmitted data are determined in dependence on an identification of the selected HF transponder by the first processing station.

Optionally, the method can further have at least one of the following steps:

detecting the identified HF transponder by a third processing station, wherein the third processing station has at least a third HF antenna having a transmission range which is arranged and configured to simultaneously detect a plurality of the HF transponders guided past the third processing station by the conveyor device, and the third processing station is configured to select the identified HF transponder from a plurality of detected HF transponders for the transmission of data;

transmitting data to the identified HF transponder by the third processing station, wherein the transmitted data are determined in dependence on an identification of the selected HF transponder by the first processing station;

printing a surface of the identified transponder by a fourth processing station.

The device and method details discussed above are described in association; it is pointed out, however, that they are also independent of one another and can also be freely combined with one another.

The claims also do not limit the disclosure and thus the possible combinations of all the indicated features with one another. All the indicated features are explicitly disclosed herein also individually and in combination with all other features.

BRIEF DESCRIPTION OF THE DRAWINGS

Possible embodiments will now be described in greater detail with reference to the accompanying schematic representations.

DETAILED DESCRIPTION OF THE EMBODIMENTS

Figure 1:
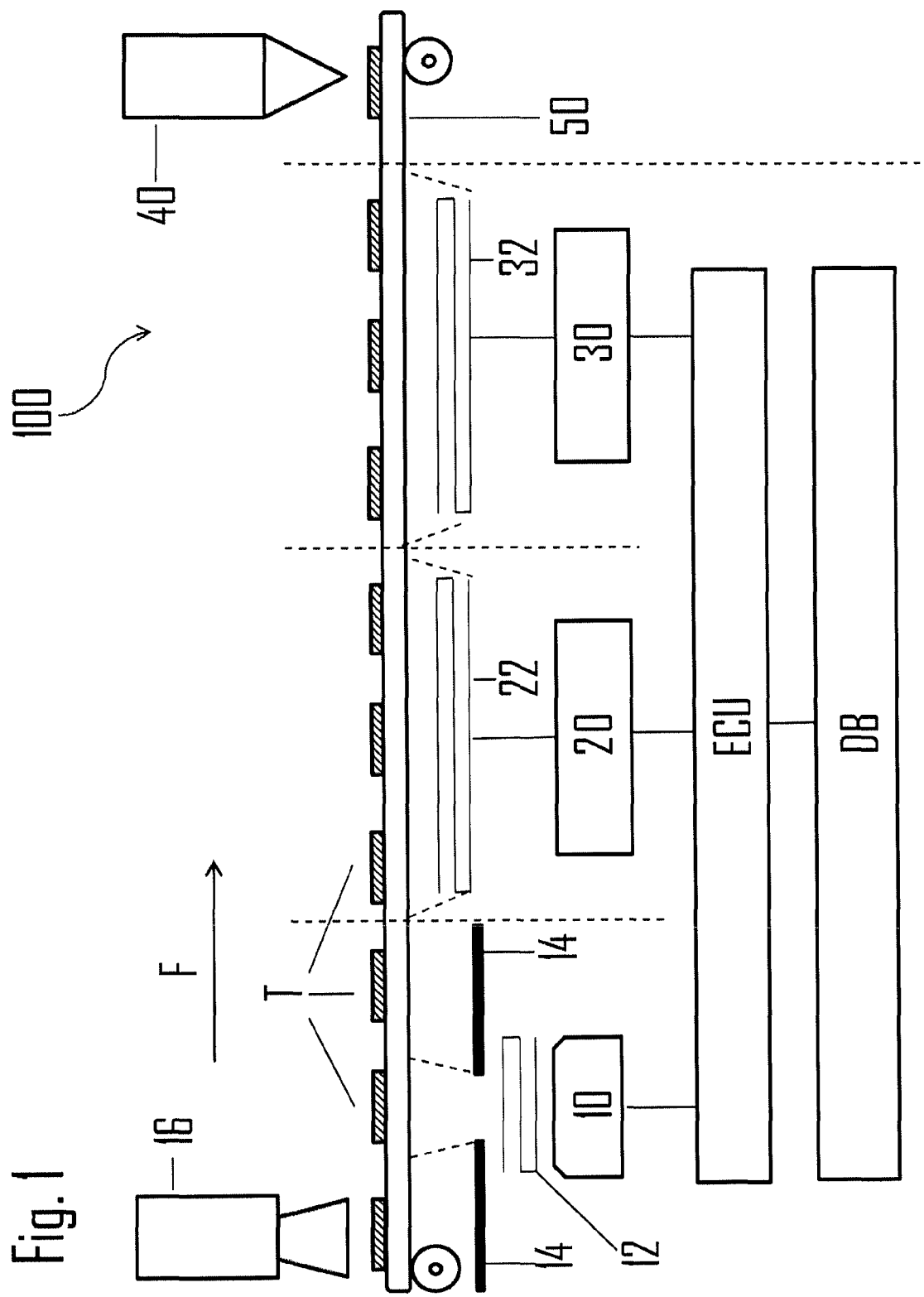
FIG. 1 shows an example of a device for coding HF transponders which are continuously guided past processing stations by a conveyor belt.

The device variants described herein and the functional and operational aspects thereof serve merely for better understanding of their structure, mode of functioning and properties; they do not limit the disclosure, for example, to the exemplary embodiments shown. The figures are schematic, whereby essential properties and effects are in some cases shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be associated with the described devices. Combinations between all the individual implementations in the text, that is to say in every section of the description, in the claims, and also combinations between different variants in the text, in the claims and in the figures, are also included and can constitute the subject-matter of further claims. The claims also do not limit the disclosure and thus the possible combinations of all the indicated features with one another. All the disclosed features are explicitly also disclosed herein individually and in combination with all the other features.

In the figures, components that correspond with one another or have similar functions are provided with corresponding reference numerals. The devices and methods will now be described by means of exemplary embodiments.

FIG. 1 shows an example of a device 100 for coding HF transponders. A conveyor device, which in the example shown is an almost endless revolving conveyor belt 50, continuously conveys a plurality of HF transponders T with a predetermined conveying speed in a conveying direction F. In the example shown, the HF transponders T are arranged on the conveyor belt 50 by an arranging device (not shown), wherein a distance between two HF transponders T is smaller than the spatial extent of the HF transponders T on the conveyor belt 50 in the conveying direction F.

A first processing station 10 comprises a reader antenna 12, the shielding elements 14 and an optically detecting camera sensor 16.

The shielding elements 14 are positioned between the reader antenna 12 and the conveyor belt 50 on which the HF transponders T are guided past the first processing station 10 in the conveying direction F. The shielding elements 14 form a gap, so that the detection range of the reader antenna 12 is reduced to a maximum of one of the HF transponders T that are being guided past. In other words, the gap formed by the shielding elements 14 corresponds to the geometry of the HF transponders T and limits the detection range of the reader antenna 12 so that only a maximum of one HF transponder T is ever in the detection range of the reader antenna 12. It can thereby be ensured that the HF transponders T are identified in the order in which they are guided past the gap of the shielding elements 14 by the conveyor belt 50.

The first processing station 10 identifies each of the HF transponders T that are guided past by wirelessly reading, by means of the reader antenna 12, a transponder-specific identifier (ID) from each of the HF transponders T that are guided past (RFID). In addition, the first processing station 10 in each case transmits corresponding identification information to a controller ECU.

The first processing station 10 further checks the HF transponders T for damage and for possible incorrect positioning on the conveyor device 50 by means of the camera sensor 16. If damage and/or possible incorrect positioning of a HF transponder is detected, corresponding information is linked by the first processing station 10 with the identification information of the damaged or incorrectly positioned HF transponder and transmitted to the controller ECU.

While the HF transponders T are being conveyed by the conveyor belt 50, the controller ECU determines for each HF transponder T, on the basis of the transponder-specific identifier (ID), a data set to be transmitted to the HF transponder and retrieves the data set from a database DB. The controller ECU further divides the data set to be transmitted into two partial data sets of substantially equal scope and transmits in each case one of the data sets, together with the transponder-specific identifier (ID), to a second and to a third processing station 20, 30. A first partial data set is transmitted with the transponder-specific identifier (ID) to the second processing station 20, and a second partial data set is transmitted with the transponder-specific identifier (ID) to the third processing station 30. The controller ECU further controls a fourth processing station 40, which will be described in greater detail hereinbelow and, in a further development, is adapted to control an elimination station (not shown) which eliminates HF transponders identified by the first processing station 10 that have recognized positioning errors and/or property defects. This elimination station (not shown) can be arranged, for example, along the conveyor device 50 between the first and the second processing station.

In the example shown, the second processing station comprises an antenna arrangement having a first HF antenna 22. The first HF antenna 22 has a transmission range in which, as shown schematically in FIG. 1, up to three HF transponders can be situated simultaneously. However, at least two HF transponders T are always simultaneously situated wholly within the transmission range of the first HF antenna 22, wherein the HF transponders T are continuously guided past the second processing station 20 by the conveyor device 50.

The second processing station 20 addresses each of the HF transponders T contactlessly by means of the first HF antenna 22 with the transponder-specific identifier (ID) previously detected by the first processing station 10, wherein the individual HF transponders T are addressed in the order in which they were identified. However, HF transponders that have already been identified as defective and/or eliminated can be excluded from an addressing sequence. If the contactless addressing of a previously identified HF transponder (RFID) by the second processing station 20 is successful, the second processing station 20 immediately continues with the transmission of the first partial data set associated with that HF transponder and previously determined by the controller ECU to the addressed HF transponder (coding), wherein the first HF antenna 22 is likewise used for this purpose. The HF transponders T are configured to detect and store (partial) data sets only after previous successful addressing, so that only the HF transponder previously addressed by the second processing station 20 is ever coded, even though at least two HF transponders are situated in the transmission range of the first HF antenna 22 at any time. When transmission of the coding is complete, or when transmission of the first partial data set to a previously addressed HF transponder is complete, the second processing station 20 immediately continues with the addressing of the next identified HF transponder, wherein the conveyor belt 50 continues to continuously convey the HF transponders T during the addressing and coding operations. The HF transponders T are accordingly coded while they are moving continuously relative to the processing stations 10, 20, 30.

If the addressing of a HF transponder by the second processing station 20 is unsuccessful, the second processing station 20 immediately addresses the next following identified HF transponder and, if the addressing is successful, transmits thereto the first partial data set determined for that HF transponder by the controller ECU. If the addressing of the next identified HF transponder is also unsuccessful or when coding of the next identified HF transponder is complete, the second processing station 20 addresses the previously unsuccessfully addressed HF transponder again. If the repeat addressing is successful, the first partial data set determined by the controller ECU is transmitted to the HF transponder as described. In contrast, if the repeat addressing is unsuccessful, coding of the unsuccessfully addressed HF transponder is finally abandoned in the example shown, and the procedure continues with the addressing of the next as yet uncoded identified HF transponder. The continuous conveying of the HF transponders T by the conveyor belt 50 is not interrupted. The second processing station 20 is further adapted to transmit to the controller ECU information about an ultimately unsuccessful addressing of a HF transponder. The controller ECU can transmit this information, for example, to an additional elimination station (not shown), which removes the uncoded HF transponders from the conveyor device.

The third processing station 30 is constructed analogously to the second processing station 20 and is arranged along the conveying path following the second processing station 20. The third processing station 30 has a third HF antenna 32, which is configured substantially in the same way as the first HF antenna 22. Analogously to the second processing station 20, the processing station 30 addresses the HF transponders in the order in which they are identified by the first processing station 10, wherein, however, already discarded, defective and/or eliminated HF transponders can be excluded from addressing. The third processing station 30 then transmits the second partial data set previously determined by the controller ECU to the addressed HF transponder, in order to complete coding. If the addressing of a HF transponder T by the third processing station 30 is unsuccessful, the third processing station likewise proceeds analogously to the second processing station 20.

The fourth processing station 40 is likewise arranged at the conveyor belt 50 and is adapted to print an optically recognizable bar code on the surface of the HF transponder T being guided past that is remote from the conveyor belt 50, wherein the bar code to be printed can be determined individually for each HF transponder T by the controller ECU on the basis of the transponder-specific identifier (ID) or can be retrieved from the database DB. In a further development, the fourth processing station 40 can also have an additional reader antenna with which the HF transponders T can be identified again immediately before printing, wherein the fourth processing station 40 can either determine the bar code to be printed itself or retrieve it from the database DB.

Figure 2:
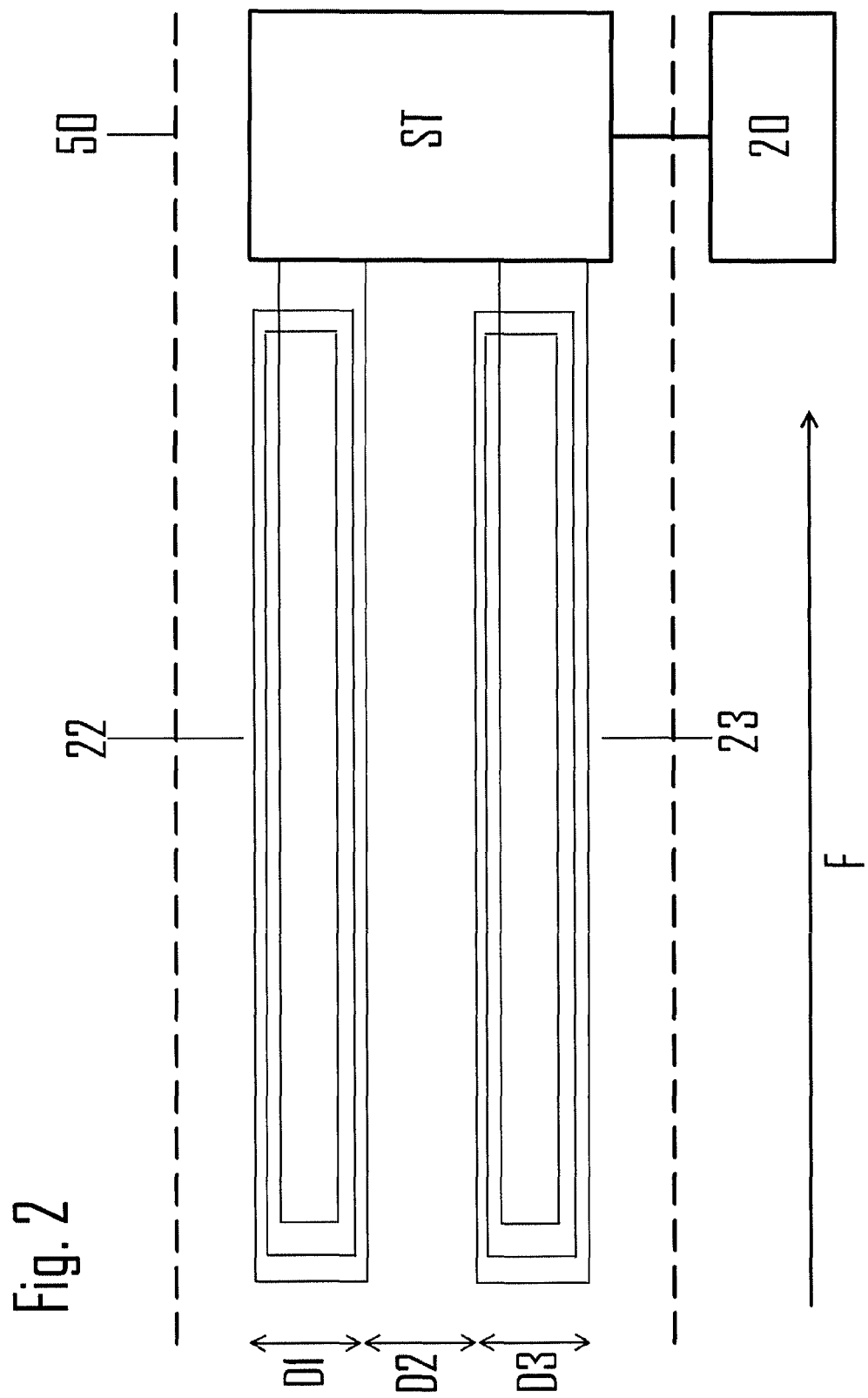
FIG. 2 shows an antenna arrangement as can be implemented, for example, in the second processing station and/or the third processing station.

FIG. 2 shows an alternative form of the antenna arrangement of the second processing station in a perspective rotated through 90° (plan view). The conveyor belt 50 guided via the second processing station 20 (or guided past the second processing station 20) is indicated only schematically by broken lines, in order not to conceal the view of the antenna arrangement.

In addition to the first HF antenna 22, the alternative antenna arrangement comprises a second HF antenna 23, which is configured in the same way as the first HF antenna 22. The first HF antenna 22 has a transverse extent D1, wherein the transverse extent denotes the maximum spatial extent of the antenna orthogonally to the conveying direction F of the conveyor belt 50. The second HF antenna 23 has a transverse extent D3 which, because the two HF antennas 22, 23 are configured in the same way, is equal to the transverse extent D1. The two HF antennas are further arranged parallel to one another and parallel to the conveying direction F of the conveyor belt 50 and are spaced apart from one another orthogonally to the conveying direction F by a distance D2. In the example shown, the distance D2 corresponds to the transverse extents D1, D3 of the two parallel HF antennas.

Both the first HF antenna 22 and the second HF antenna 23 are supplied with electrical energy via a jointly used voltage divider ST. The second processing station 20 can thereby be adapted to transmit coding information, for example a (partial) data set determined by the controller ECU, to a HF transponder guided via the conveyor belt 50 and to use for this purpose the first HF antenna 22 and the second HF antenna 23 simultaneously. The first and the second HF antenna can be used jointly for the contactless transmission of data. A HF transmission signal of the two HF antennas delivered in the transmission range of the HF antennas can thereby be improved, for example amplified.

Alternatively, two HF transponders guided side by side orthogonally to the conveying direction F can also each be coded using the arrangement shown in FIG. 2. The production rate of the device can thus be doubled.

An advantage of the antenna arrangement shown in FIG. 2 is that the second processing station does not have to be structurally adapted for conversion of a production operation from a "single-track" HF transponder coding operation to a "two-track" HF transponder coding operation. Thus, for example, comparatively large HF transponders can be coded in a "single-track" operation of the device, while comparatively small HF transponders can be coded in a "two-track" operation of the device.

The arrangement shown in FIG. 2 can be applied analogously to an antenna arrangement of the third processing station 30, which can comprise a third and a fourth HF antenna.

The above-described variants of the method and of the device serve merely for better understanding of the structure, the mode of functioning and the properties of the solution presented; they do not limit the disclosure, for example, to the exemplary embodiments. The figures are schematic, whereby essential properties and effects are in some cases shown on a significantly enlarged scale in order to clarify the functions, active principles, technical configurations and features. Any mode of functioning, any principle, any technical configuration and any feature that is/are disclosed in the figures or in the text can be combined freely and arbitrarily with all the claims, any feature in the text and in the other figures, other modes of functioning, principles, technical configurations and features which are contained in this disclosure or follow therefrom, so that all conceivable combinations are to be attributed to the described solution. Combinations between all the individual implementations in the text, that is to say in every section of the description, in the claims, and also combinations between different variants in the text, in the claims and in the figures, are also included.

The invention claimed is:

1. A device for coding high frequency (HF) transponders comprising:
   a conveyor device which is arranged and configured to guide HF transponders past a plurality of processing stations in a continuous movement;
   a first processing station which is arranged and configured to identify HF transponders guided past the first processing station; and
   a second processing station having at least a first HF antenna, wherein
      the first HF antenna has a transmission range which is arranged and configured to simultaneously detect a plurality of the HF transponders guided past the second processing station by the conveyor device,
      the second processing station is configured to address the HF transponders previously identified by the first processing station with the first HF antenna and then, if the addressing of a particular previously identified HF transponder was successful, to select the addressed HF transponder detected by the transmission range of the first HF antenna for the transmission of coding data, and
      to transmit coding data to the selected HF transponder, wherein the transmitted coding data are determined in dependence on an identification of the selected HF transponder by the first processing station,
   wherein
      the second processing station is further adapted, in the case of unsuccessful addressing of a first previously identified HF transponder, immediately to continue with the addressing of a further identified HF transponder following the first identified HF transponder and, if the addressing of the further identified HF transponder was successful, to code that HF transponder, and to address the first identified HF transponder again when coding of the further identified HF transponder is complete.

2. The device as claimed in claim 1, wherein
   the conveyor device is a conveyor belt guided via rollers that is suitable for guiding the plurality of HF transponders one after the other past the plurality of processing stations in a continuous movement, and/or
   the conveyor device is suitable for guiding past the plurality of processing stations the plurality of HF transponders arranged side by side orthogonally to a conveying direction and/or the plurality of HF transponders arranged one behind the other in the conveying direction.

3. The device as claimed in claim 1, wherein
   the first processing station comprises a reader antenna which is suitable for identifying a HF transponder guided past the first processing station, and/or
   the first processing station comprises shielding elements which are arranged and configured to electromagnetically shield all the HF transponders, apart from a HF transponder that is being guided past the first processing station, from a detection range of the reader antenna, and/or
   the first processing station comprises at least one optically detecting sensor that is suitable for identifying a HF transponder on the basis of optically recognizable features and/or of detecting a property defect of a HF transponder and/or of detecting a positioning error of a HF transponder on the conveyor device.

4. The device as claimed in claim 1, wherein
   the second processing station further comprises a second HF antenna, wherein
   the first HF antenna and the second HF antenna are configured in the same way, and/or
   the first HF antenna and the second HF antenna are supplied with electrical energy by a common voltage divider.

5. The device as claimed in claim 4, further comprising a third processing station having a third HF antenna and/or a fourth HF antenna, wherein
   the third HF antenna and/or the fourth HF antenna each have a transmission range which is arranged and configured to simultaneously detect a plurality of the HF transponders guided past the third processing station by the conveyor device,
   the third processing station is configured to select one of the HF transponders detected by the transmission range of the third and/or fourth HF antenna for the transmission of data, and
   to transmit data to the selected HF transponder, wherein the transmitted data are determined in dependence on an identification of the selected HF transponder by the first processing station.

6. The device as claimed in claim 5, further comprising a fourth processing station which is arranged and configured to print a surface of the HF transponders that are being guided past with a bar code or QR code.

7. The device as claimed in claim 5, further comprising a database which stores data which are to be transmitted to a specific HF transponder, wherein the device preferably further comprises a controller which is configured to determine data stored in the database in dependence on an identification of a HF transponder by the first processing station, wherein
the determined data are transmitted to the second and/or third processing station with information which associates the data with the identified HF transponder.

8. A method that is carried out with the device as claimed in claim 4 comprises the steps of:
continuously conveying the HF transponders in a conveying direction past the plurality of processing stations by the conveyor device;
identifying a HF transponder by the first processing station;
detecting the identified HF transponder by the second processing station, wherein
the second processing station has at least the first HF antenna having a transmission range which is arranged and configured to simultaneously detect a plurality of the HF transponders guided past the second processing station by the conveyor device, and the second processing station is configured to address the HF transponders previously identified by the first processing station with the first HF antenna and then, if the addressing of the particular previously identified HF transponder was successful, to select the identified addressed HF transponder from a plurality of detected HF transponders for the transmission of coding data;
transmitting coding data to the identified HF transponder by the second processing station, wherein
the transmitted coding data are determined in dependence on the identification of the selected HF transponder by the first processing station, and wherein
in the case of unsuccessful addressing of the first previously identified HF transponder, the procedure immediately continues with the addressing of the further identified HF transponder following the first identified HF transponder and, if the addressing of the further identified HF transponder is successful, that HF transponder is coded, and the first identified HF transponder is addressed again when coding of the further identified HF transponder is complete.

9. The method as claimed in claim 8, further comprising at least one of the steps of:
detecting the identified HF transponder by a third processing station, wherein
the third processing station has at least a third HF antenna having a transmission range which is arranged and configured to simultaneously detect the plurality of the HF transponders guided past the third processing station by the conveyor device, and the third processing station is configured to select the identified HF transponder from a plurality of detected HF transponders for the transmission of data;
transmitting data to the identified HF transponder by the third processing station, wherein
the transmitted data are determined in dependence on the identification of the selected HF transponder by the first processing station;
printing a surface of the identified transponder by a fourth processing station.

* * * * *